United States Patent Office 3,347,693
Patented Oct. 17, 1967

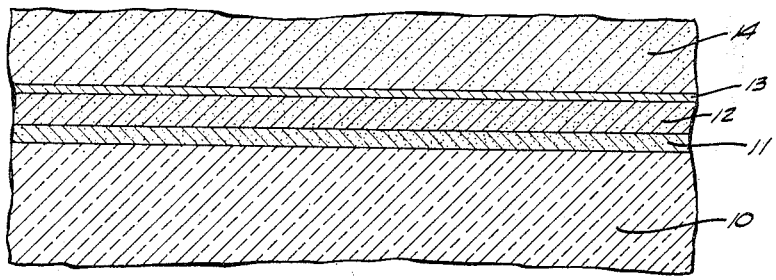
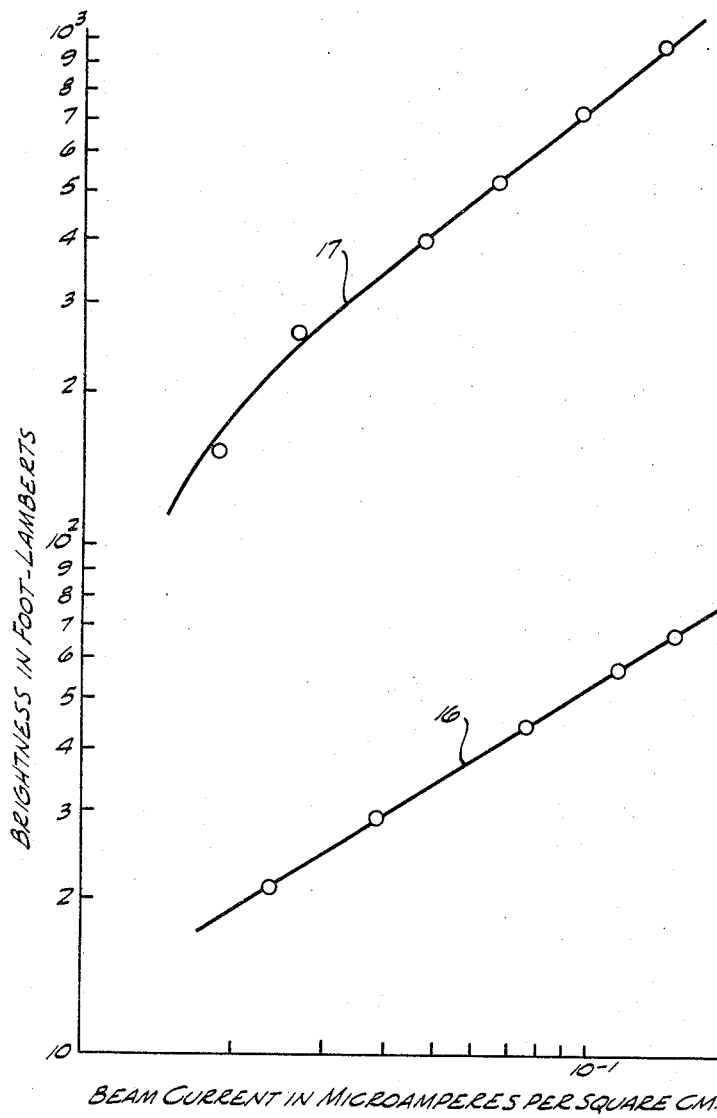

3,347,693
HIGH BRIGHTNESS LUMINESCENT EVAPORATED FILM
Paul H. Wendland, Malibu, Calif., assignor to Hughes Aircraft Company, Culver City, Calif., a corporation of Delaware
Filed July 7, 1964, Ser. No. 380,884
5 Claims. (Cl. 117—33.5)

This invention relates to an improved, high brightness, high contrast, high resolution cathode luminescent film for cathode ray tube viewing screens, and to a method for preparing the film.

Cathode ray tubes normally use viewing screens composed of powdered phosphors. Because these conventional screens consist of small particles, in varying degrees of contact with the glass faceplate and each other, the resolution and the contrast is limited. The resolution is limited because of the microscopic discontinuities in the phosphor screen in going from particle to particle. The contrast is less than optimum because of the spurious reflections or scattering of light from the phosphor particles.

Continuous thin phosphor films offer one solution to these resolution and contrast problems. Such films, because they are in complete optical contact, reduce the scattering of light if they are highly transparent. Also, if the activation of the film is uniform, extremely high resolution images can be formed.

Many attempts have been made to produce such transparent phosphor coatings. One obvious technique is to evaporate the powdered phosphor onto a transparent surface. This technique is well known and has been tried for a large number of phosphors. Clear coatings are easily obtained but action of the activator is almost always lost in the process. Consequently, if there is any luminescent response in the film it is of very low efficiency as compared to that exhibited by powdered layers. The best powdered layers exhibit luminous efficiencies in the order of 15% as compared to substantially less than 1% for the films prepared by straightforward evaporation techniques.

Two improved techniques for producing thin phosphor films have been reported in the literature.

One technique utilized by Studer and Cusano, J. Opt. Soc. Amer., vol. 45, No. 7, p. 493, July 1955, is called the vapor deposition process. With this technique a transparent film of ZnS:Mn is produced on a glass surface by bringing together zinc and manganese vapor at the surface heated to 500° to 600° C. in an atmosphere of a few millimeters of $H_2S$. A ZnS:Zn film may also be deposited by similar techniques.

While this technique does produce thin films with improved efficiencies, it has several disadvantages. One is that the vapor deposition process involves several extra steps over that of straight evaporation. Also, the requirement of a 500° to 600° C. substrate temperature is not readily achieved, but requires additional equipment and time. Thus, this process is far from ideal for mass production of screens.

Also, while the brightness of the ZnS:Mn films is about one-fifth that of powdered ZnS:Mn, it is still only about ⅕₂₅ that of conventional television screens using Zn, CdS:Ag.

The vapor deposition technique has been improved by Feldman and O'Hara, J. Opt. Soc. Amer., vol. 47, No. 4, p. 300, April 1957. In this technique, the powdered material is evaporated. However, Feldman and O'Hara point out that the activator is not lost as a result of this evaporation process but probably exists as a separate phase in the film. By a subsequent firing process it is recombined with the crystallites. The firing process also promotes the growth of the crystals. By means of this technique Feldman and O'Hara produced both clear and fogged films. The clear films had light output comparable to the clear films produced by Studer and Cusano while the fogged films were almost as efficient as the powdered phosphor ZnS:Mn. Feldman and O'Hara could not produce thin films of ZnCdS:Ag.

Accordingly, it is an important object of this invention to provide a luminescent film for a cathode ray tube viewing screen characterized by having improved brightness, contrast and resolution.

Another object of this invention is to provide a method for producing an improved high brightness, high contrast, high resolution cathode luminescent film for cathode ray tube viewing screens.

Additional objects will become apparent from the following description, which is given primarily for purposes of illustration, and not limitation.

Broadly stated in general terms, the objects of this invention are attained by providing a method and a film in which a large amount of cadmium chloride ($CdCl_2$) is used to act as a flux for the introduction of silver (Ag) activator into the film. Appropriate amounts of cadmium sulfide (CdS) and zinc sulfide (ZnS) also are introduced into the film to produce a film having the composition Zn, Cd, Ag:Cd, Cl.

A more detailed description of the invention is given with reference to the accompanying drawing, wherein:

FIG. 1 shows a greatly enlarged, cross-sectional view of the film of the invention evaporated onto a glass substrate; and FIG. 2 is a graph showing brightness of luminescent films as a function of beam current for a film of this invention and a prior art film.

The high cathode luminescent films of the invention are prepared by closely following the specific evaporation procedures outlined below:

(1) One-half part by weight of $CdCl_2$ is evaporated onto a glass substrate 10 at 100° C. to produce a film 11 of $CdCl_2$.

(2) One part by weight of CdS is evaporated over the $CdCl_2$ film 11 at 100° C. on the glass substrate 10 to produce a CdS film 12.

(3) One-hundredth part by weight of Ag is evaporated over the CdS film 12 at 100° C. to produce a Ag film 13.

(4) The resulting composite film 11, 12, 13 on glass substrate 10 is heated in a nitrogen atmosphere for 10 minutes at 500° C.

(5) Two parts by weight of ZnS is evaporated over the Ag film 13 at 100° C. to produce a ZnS film 14.

(6) The resulting composite film 11, 12, 13, 14 is heated in a nitrogen atmosphere for 20 minutes at 550° C.

A feature of the method and film of this invention is the use of sufficient amounts of $CdCl_2$ to act as a flux for the introduction of the Ag activator. When the $CdCl_2$ film 11 is omitted, no cathode luminescene is observed with the Ag activator film 13. It also is necessary to use the sequence of steps, as outlined above, to obtain the highest brightness films. When the CdS film 12 is omitted, only weak cathode luminescence is observed, and without the use of ZnS film 14, similarly weak cathode luminescence is obtained. If the Ag film 13 is omitted from the composite film 11, 12, 13, 14 substantially no cathode luminescence is observed. If heating step 4 is omitted, the resulting composite film 11, 12, 13, 14 peels off the glass substrate 10, and if heating step 5 is omitted, only weak cathode luminescence is observed.

Films produced by the method of the invention showed greater brightness for a given beam current than films produced by prior art methods. This is illustrated in FIG. 2 where curve 16 was obtained for a film produced by the use of the Feldman and O'Hara method to which reference was made hereinabove. Curve 17 was obtained from a film produced by the use of the method of the invention described hereinabove. It will be noted that the brightness in foot-lamberts obtained with the film prepared by the method of the invention is considerably greater than that obtained with the prior art film for a given amount of beam current in microamperes per square centimeter.

A film having the chemical composition of the film of the invention, in the powdered form has conversion efficiencies, from electron beam to radiant energy, of about 20% compared to 4% for manganese activated zinc sulfide films (ZnS:Mn). Since the luminous efficiency of radiation from the powder form Zn, Cd, Ag:S, Cl film and the ZnS:Mn film is about equal, the potential, ideal, overall efficiency of the continuous film of the invention is five times greater than the ZnS:Mn film of the prior art.

The spectral output, or color, of the films of the invention can be varied by changing the ratio of zinc to cadmium (Zn:Cd) atoms in the film. The films of the invention have higher resolution because they are continuous. Use of the films of the invention in cathode ray tubes increases the contrast over that obtainable with conventional powdered phosphors.

Obviously many other modifications and variations of the present invention are possible in the light of the above teachings. It is therefore to be understood that within the scope of the appended claims the invention can be practiced otherwise than as specifically described.

What is claimed is:

1. A method for preparing a luminescent film which comprises the steps of evaporating a layer of cadmium chloride onto a substrate, evaporating a layer of cadmium sulfide over the cadmium chloride layer, evaporating silver activator onto the resulting layer, heating the resulting layer in an inert atmosphere, evaporating a layer of zinc sulfide over the resulting layer, and heating the resulting layer in an inert atmosphere.

2. A method for preparing a luminescent film which comprises the steps of evaporating a layer of about one-half part by weight of cadmium chloride onto a substrate, evaporating a layer of about one part by weight of cadmium sulfide over the cadmium chloride layer, evaporating a layer of about one-hundredth part by weight of silver onto the resulting layer, heating the resulting layer in an inert atmosphere, evaporating a layer of about two parts by weight of zinc sulfide over the resulting layer, and heating the resulting layer in an inert atmosphere.

3. A method for preparing a luminescent film which comprises the steps of evaporating a layer of about one-half part by weight of cadmium chloride onto a glass substrate at about 100° C., evaporating a layer of about one part by weight of cadmium sulfide over the cadmium chloride layer at about 100° C., evaporating a layer of about one-hundredth part by weight of silver onto the resulting layer at about 100° C., heating the resulting layer in a nitrogen atmosphere for about 10 minutes at about 500° C., evaporating a layer of about two parts by weight of zinc sulfide over the resulting layer at about 100° C., and heating the resulting layer in a nitrogen atmosphere for about 20 minutes at about 550° C.

4. The article produced by the method of claim 1.

5. The article produced by the method of claim 3.

References Cited

UNITED STATES PATENTS

| | | | |
|---|---|---|---|
| 3,062,750 | 11/1962 | Umberger et al. | 117—33.5 |
| 3,108,021 | 10/1963 | Stanley | 117—217 |
| 3,299,307 | 11/1967 | Inove | 117—217 |

ALFRED L. LEAVITT, *Primary Examiner.*

A. ROSENSTEIN, *Assistant Examiner.*